United States Patent
Hamasaki et al.

(10) Patent No.: US 7,424,311 B2
(45) Date of Patent: Sep. 9, 2008

(54) MOUNTING DEVICE FOR MOBILE INFORMATION TERMINAL, AND MOBILE INFORMATION TERMINAL

(75) Inventors: Shogo Hamasaki, Kasuya-Gun (JP); Daisuke Iino, Funabashi (JP); Makoto Fujimoto, Kyoto (JP); Kazuhisa Watanabe, Yokohama (JP); Atsushi Saso, Kawasaki (JP); Norihiko Kobayashi, Suginami-Ku (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/702,567

(22) Filed: Feb. 6, 2007

(65) Prior Publication Data

US 2007/0142097 A1 Jun. 21, 2007

Related U.S. Application Data

(62) Division of application No. 10/682,934, filed on Oct. 14, 2003, now abandoned.

(30) Foreign Application Priority Data

Oct. 21, 2002 (JP) .............................. 2002-305976

(51) Int. Cl.
*H04M 1/00* (2006.01)
(52) U.S. Cl. .................. 455/556.1; 455/557; 455/575.8
(58) Field of Classification Search ... 455/575.1–575.9, 455/556.1, 573; 379/446, 447, 451, 454, 379/455
See application file for complete search history.

(56) References Cited

U.S. PATENT DOCUMENTS

| | | | |
|---|---|---|---|
| 5,202,913 A | 4/1993 | Lang et al. | |
| 5,535,274 A * | 7/1996 | Braitberg et al. | 379/446 |
| 5,584,054 A | 12/1996 | Tyneski et al. | |
| 6,085,078 A | 7/2000 | Stamegna | |
| 6,138,041 A | 10/2000 | Yahia | |
| 6,188,917 B1 | 2/2001 | Laureanti | |
| 6,389,268 B1 | 5/2002 | Snyder | |
| 6,406,321 B1 | 6/2002 | Hayashi et al. | |
| 6,731,913 B2 | 5/2004 | Humphreys et al. | |
| 6,957,082 B2 | 10/2005 | Saito | |
| 2002/0052137 A1 | 5/2002 | Hayashi et al. | |
| 2002/0185530 A1 * | 12/2002 | Jung et al. | 235/382 |
| 2004/0192372 A1 | 9/2004 | Richards et al. | |
| 2007/0297149 A1 * | 12/2007 | Richardson et al. | 361/731 |

FOREIGN PATENT DOCUMENTS

| | | |
|---|---|---|
| CN | 1351393 | 5/2002 |
| JP | 11-074654 | 3/1999 |
| JP | 2000-134821 | 5/2000 |
| JP | 2000-322154 | 11/2000 |
| JP | 2002-062578 | 2/2002 |
| JP | 2002-141140 | 5/2002 |

* cited by examiner

*Primary Examiner*—Duc Nguyen
*Assistant Examiner*—Eric Elcenko
(74) *Attorney, Agent, or Firm*—Wenderoth, Lind & Ponack, L.L.P.

(57) ABSTRACT

A mounting device includes a case that has an insertion inlet for a mobile information terminal, a connector that establishes electrical connection to the mobile information terminal inserted in the insertion inlet, and an ejection mechanism that ejects the mobile information terminal after completion of processing through the connector. After the completion of the processing, by an action of the ejection mechanism, the mobile information terminal is popped up from the mounting device, and a user is understandably notified of the completion of the processing.

6 Claims, 14 Drawing Sheets

MOUNTING DEVICE FOR MOBILE INFORMATION TERMINAL, AND MOBILE INFORMATION TERMINAL

This application is a divisional application of application Ser. No. 10/682,934, filed Oct. 14, 2003 now abandoned.

BACKGROUND OF THE INVENTION

1. Field of the Invention

The present invention relates to a mounting device to which a mobile information terminal is mounted, and an art related thereto.

2. Description of the Related Art

As electronic-communications technology has advanced in recent years, small-sized, lightweight, and thin-sized display devices (for example, LCD, organic electroluminescence, electronic paper, etc.) have spread out widely, and mobile information terminals (for example, PDA (Personal Digital Assistant), etc.) with these display devices and mounting devices for such mobile information terminals have been used practically.

In general, such a mounting device is only an adapter that makes an adjustment with a charging unit or a connection interface.

As for this point, contrivance, which improves a function of the mounting device, has been proposed and disclosed in published Japanese Patent Application Laid-Open No. 2002-288143 (reference 1).

However, even with the reference 1, the mounting device has not gone beyond the stage of the mere adapter from the point of view of operability for the mounting device. Therefore, it is hard to say that a user can be understandably notified of processing status of the mounting device.

A prior art has been proposed and disclosed in published Japanese Patent Application Laid-Open No. 2002-134821 (reference 2), which enables the mounting device to eject a mobile terminal from the mounting device by an ejection mechanism when charging is completed.

However, in the art mentioned above, when communication and charging are carried out simultaneously, the mobile terminal will be ejected at the time of the completion of charging, communication will be interrupted, and it is inconvenient.

A prior art has been proposed and disclosed in published Japanese Patent Application Laid-Open No. H11-74654 (reference 3), which can easily confirm contents of outputs of an LCD while the terminal itself is mounted to the mounting device.

However, the prior art cuts out a part of the surface of the mounting device, and only exposes a part of the LCD. Therefore, it cannot be said that contents of the display can be extremely understandable with the prior art.

OBJECTS AND SUMMARY OF THE INVENTION

An object of the present invention is to provide a mounting device that is able to notify a user of processing status of the mounting device and an art related thereto.

A first aspect of the present invention provides a mounting device, to which a mobile information terminal with a display unit is operable to be freely mounted and dismounted, operable to execute processing for the mobile information terminal. The mounting device comprises an ejection mechanism operable to eject the mobile information terminal at time of or after completion of the processing.

According to the construction described above, when processing for the mobile information terminal mounted to the mounting device is completed, the mobile information terminal is ejected. Then, the mobile information terminal changes a relative relationship of position with the mounting device. Therefore, a user is easily able to know that the processing has been completed.

A second aspect of the present invention as defined in the first aspect of the present invention provides a mounting device, which performs processing comprising communications with the mobile information terminal.

According to the construction described above, communications with the mobile information terminal can be performed by the mounting device; hence, a user is easily able to know that the processing for the communications is completed.

A third aspect of the present invention provides a mounting device comprising: a case that possesses an insertion inlet for a mobile information terminal, and a lock mechanism that is operable to prohibit or permit dismounting the mobile information terminal inserted to the insertion inlet.

According to the construction described above, accidental ejection of the mobile information terminal from the mounting device during processing can be prevented, and discontinuation of the processing due to the ejection can be avoided.

Therefore, not only the user of the mobile information terminal, but also a malicious third person cannot eject the mobile information terminal. Especially in the case where the mounting device is installed in a public place, such as a store, and the mobile information terminal is mounted to the mounting device, the mobile information terminal can be protected from theft. As a result, attending or keeping a lookout for the mobile information device not to be stolen is not necessary.

A fourth aspect of the present invention provides a mounting device comprising: a case that possesses an insertion inlet for a mobile information terminal, a connector that is operable to establish electrical connection with the mobile information terminal inserted to the insertion inlet, and an ejection mechanism that is operable to eject the mobile information terminal at time of or after completion of processing, wherein the ejection mechanism operates according to a signal via the connector.

According to the construction described above, a user inserts the mobile information terminal into the mounting device from the insertion inlet of the mounting device, to mount the mobile information terminal to the mounting device. Thereby, the connector is electrically connected, and processing is performed for the mobile information terminal via the connector.

When the processing for the mobile information terminal mounted to the mounting device is completed, the mobile information terminal is ejected, the electrical connection by the connector is canceled, and the mobile information terminal changes the relative relationship of position with the mounting device. Then, the user can be notified of the processing having been completed.

A fifth aspect of the present invention as defined in the fourth aspect of the present invention provides a mounting device, which comprises a charger that is operable to electrically charge the mobile information terminal via the connector.

According to the construction described above, charging the mobile information terminal via the connector can be performed.

A sixth aspect of the present invention as defined in the fourth aspect of the present invention provides a mobile information terminal, which comprises a control unit that is operable to control the ejection mechanism via the connector.

According to the construction described above, the mobile information terminal can perform control of the mounting device, and a special control unit and so on does not need to be installed in the mounting device; therefore, space efficiency and cost efficiency can be improved.

A seventh aspect of the present invention provides a mounting device, to which a mobile information terminal with a display unit is freely mounted and dismounted, operable to execute processing for the mobile information terminal. The mounting device comprises at least one window through which a content displayed on the display unit is possible to be visually recognized from outside the at-least-one window.

An eighth aspect of the present invention provides a mounting device, which comprises a case having an insertion inlet for a mobile information terminal with a display unit, and at least one window furnished on the case. The at-least-one window is operable to partition the display unit.

According to the two kinds of construction described above, in the display unit, displaying with different modes for each domain partitioned by the at-least-one window can be performed.

A ninth aspect of the present invention as defined in the eighth aspect of the present invention provides a mounting device, which further comprises a connector that is operable to establish electrical connection with the mobile information terminal inserted to the insertion inlet.

According to the construction described above, processing such as communication or power feeding via the connector can be performed between the mounting device and the mobile information terminal.

A tenth aspect of the present invention as defined in the ninth aspect of the present invention provides a mounting device, which further comprises an input unit that is related to the at-least-one window, wherein the mobile information terminal inserted to the insertion inlet can be controlled by manipulating the input unit.

Here, it is presupposed that the mobile information terminal is used while being carried, in general. According to the construction described above, when the mobile information terminal is mounted to the mounting device, the mobile information terminal can be used just like a stand-alone information terminal.

Even when the mobile information terminal does not comprise an input method, by using the input method of the mounting device, an operating environment equivalent to the case where the mobile information terminal comprises the input method can be provided for users.

A eleventh aspect of the present invention as defined in the eighth aspect of the present invention provides a mounting device, which is made such that a front part of the case is open and covered with a plate furnished with at least one window, through which a content displayed on the display unit is possible to be visually recognized from outside.

According to the construction described above, various functions can be added to the mounting device, by separating the mounting device up into the plate and the others and by exchanging only the plate.

A twelfth aspect of the present invention as defined in the eleventh aspect of the present invention provides a mounting device, which is made such that the plate is prepared in a plurality of kinds and furnished with a differently shaped window and unique identification information, and that the case comprises a sensor that is operable to read the identification information, and that a content to be displayed on the display unit is able to be altered according to the identification information read by the sensor.

According to the construction described above, the contents of the display can be changed by exchanging the plate. The contents can be understandably displayed by changing the shape, the size and the number of the windows in response to use.

A thirteenth aspect of the present invention as defined in the ninth aspect of the present invention provides a mobile information terminal, which is mounted to a mounting device and comprises a control unit that is operable to control the display unit via the connector, wherein the control unit is operable to control the display unit to display different displays in every domain partitioned by the at-least-one window.

According to the construction described above, without controlling the mode of the display in the mounting device, displaying with different modes for each domain divided by the at-least-one window can be performed in the display unit.

A fourteenth aspect of the present invention provides a mobile information terminal, which comprises a card insertion unit to which a card is inserted, wherein the card insertion unit is furnished with a window through which a card inserted into the card insertion unit is possible to be visually recognized from outside.

According to the construction described above, a user can acquire information regarding the card, while the card is inserted into and not taken out from the card insertion unit.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Hereafter, the embodiments of the present invention are explained, referring to drawings.

Embodiment 1

Figure 1:
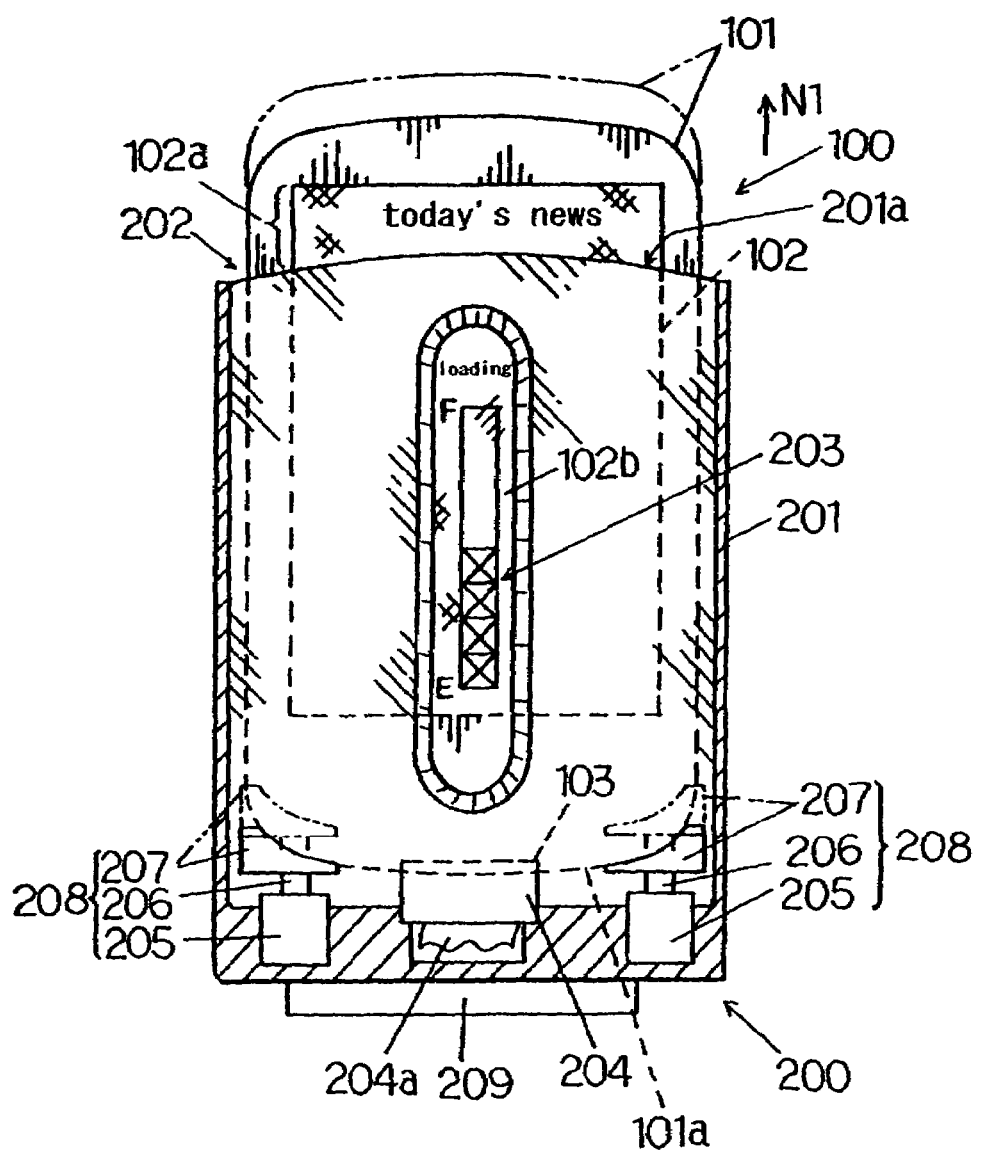
FIG. 1 is a drawing illustrating the front view of a mounting device and a mobile information terminal in a first embodiment of the present invention.

FIG. 1 is the drawing illustrating the front view of the mounting device and the mobile information terminal in the first embodiment of the present invention.

As shown in FIG. 1, a mounting device 200 comprises a case 201 and a support unit 209.

The case 201, which is a shape of a box, possesses an opening portion at the upper edge. The opening portion is an insertion inlet 202 for a mobile information terminal 100.

The mobile information terminal 100 is inserted from the insertion inlet 202, and is mounted to the mounting device 200 in a freely connectable and separatable manner.

A window 203 is established in the central part of the front side of the case 201. When the mobile information terminal 100 is inserted from the insertion inlet 202, a part of a display unit 102 of the mobile information terminal 100 can be confirmed by looking from the outside via the window 203.

The window 203 may be a complete hole, or may be sealed off by transparent resin, etc., in order to confirm the inside by looking from the outside.

A connector 204 is formed in the bottom side of the case 201. When the connector 204 is connected to a connector 103 of the mobile information terminal 100, the mounting device 200 and the mobile information terminal 100 are electrically connected, and then charging and communications can be performed.

Figure 2:
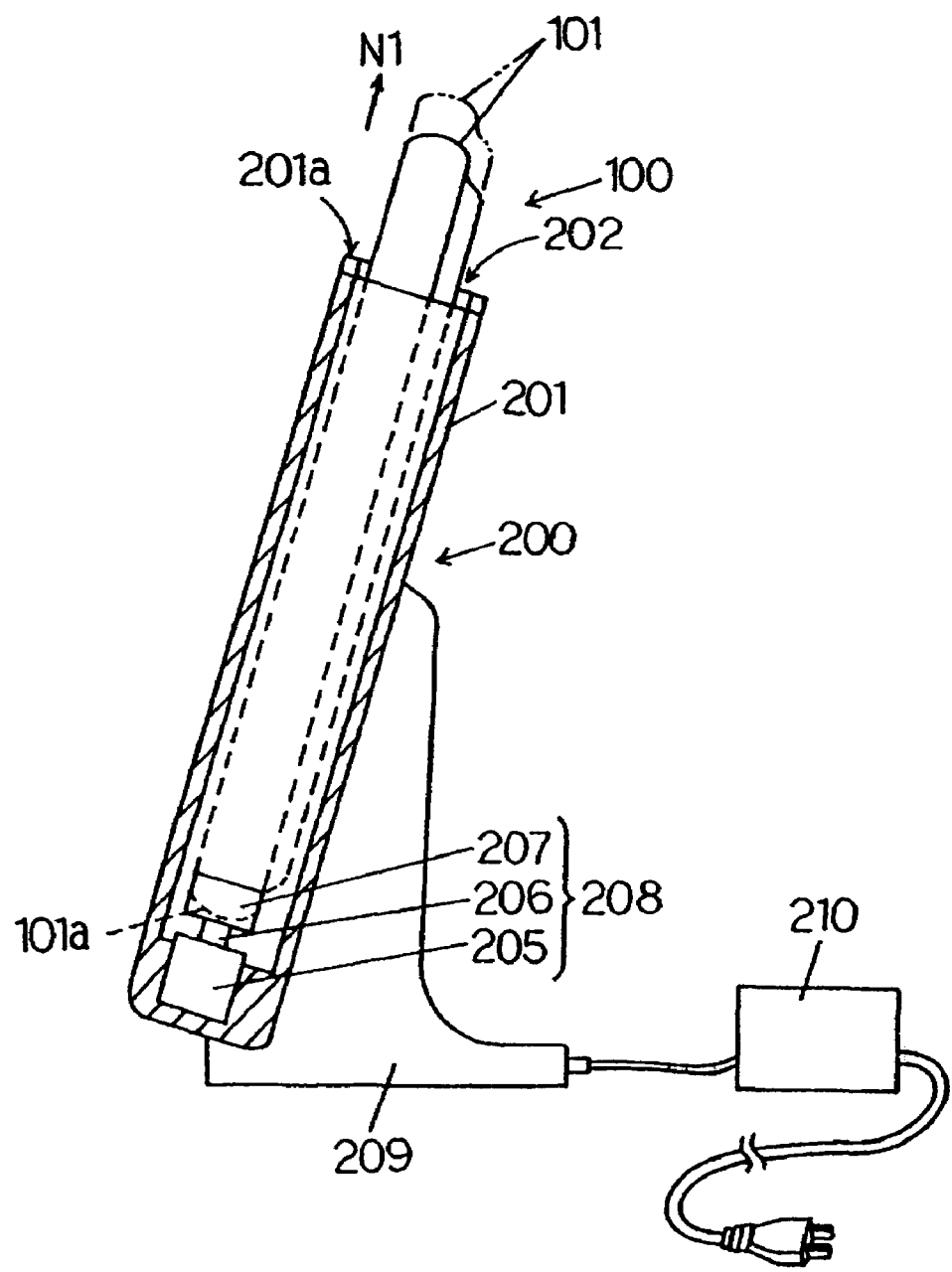
FIG. 2 is a drawing illustrating the side view of the mounting device and the mobile information terminal in the first embodiment of the present invention.
Figure 3:
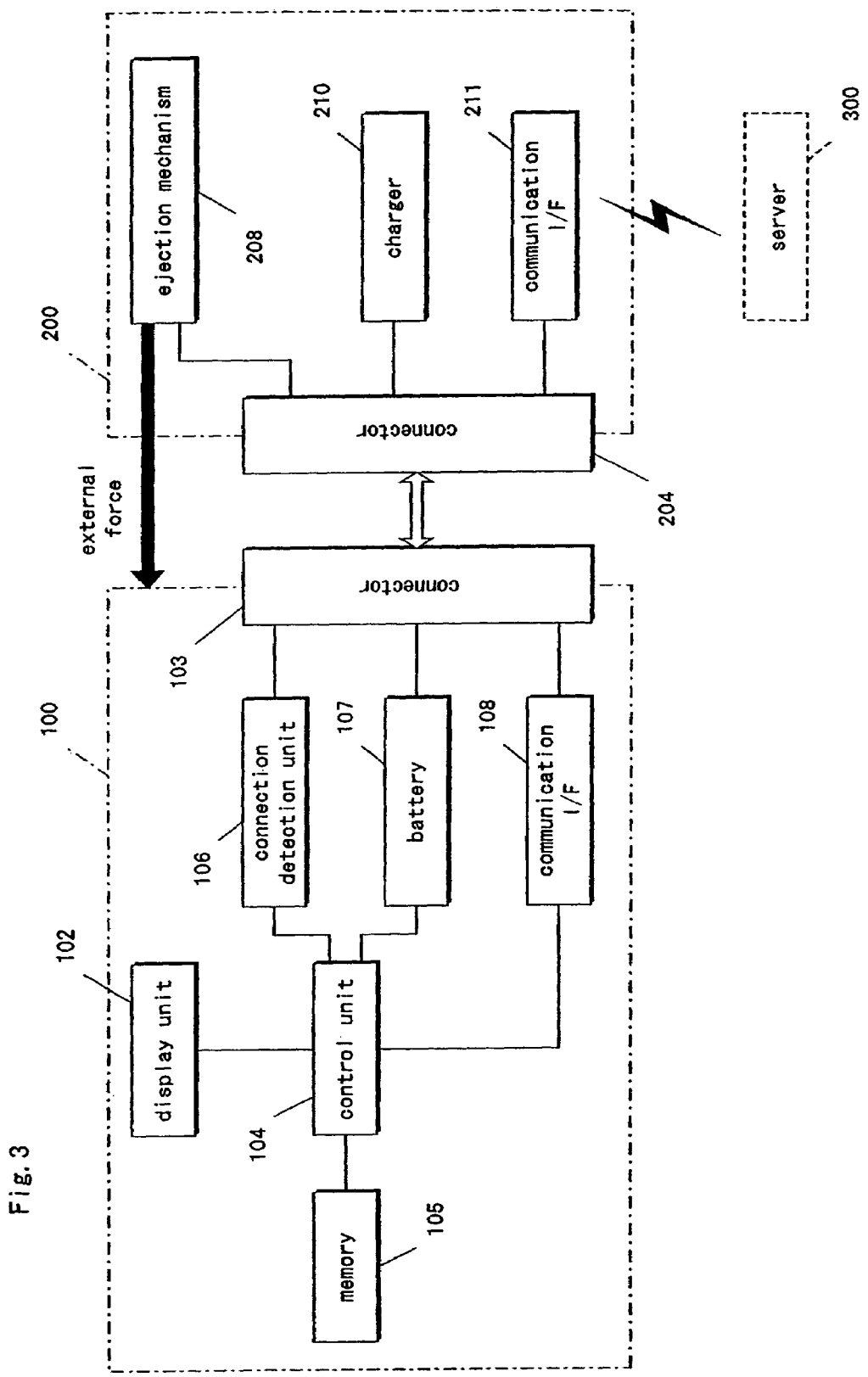
FIG. 3 is a block diagram illustrating the mounting device and the mobile information terminal in the first embodiment of the present invention.

As shown in FIG. 2 and FIG. 3, a wiring 204a connects the connector 204 of the mounting device 200 to a charger 210 and a server 300, etc., that are provided outside of the mounting device 200.

An ejection mechanism 208 is stored in the bottom of the case 201 of the mounting device 200.

In the present example, this ejection mechanism 208 is composed of a solenoid 205, a rod 206 of the solenoid 205, and a member 207. The member 207 contacts a bottom 101a of a case 101.

The mobile information terminal 100 possesses the display 102, such as LCD, organic electroluminescence, and electronic paper so on.

As shown in FIG. 1, when the connectors 204 and 103 are electrically connected, a first domain 102a of the display unit 102 is exposed to the outside at the upper side of an upper edge 201a of the case 201. A second domain 102b can be seen from the outside through the window 203.

As shown in FIG. 1, information, such as "today's news", is displayed on the first domain 102a. Display mode for every domain can be differentiated, in the second domain 102b, such as displaying a status bar, which displays progress of charging and communications.

A detailed explanation is described later, but when processing, such as charging or communications, is completed, the solenoid 205 of the ejection mechanism 208 operates, and the rod 206 projects upward. When the member 207 goes up from a solid line position to a virtual line position, connection of the connectors 103 and 204 is canceled, and the case 101 pops upward as an arrow N1 indicates.

Thereby, a user can be intelligibly notified of the processing having been completed.

As shown in FIG. 2, a support unit 209 supports the case 201 in the state where the case 201 is a little inclined.

The charger 210 is connected to the back of the support unit 209.

The internal constructions of the mounting device 200 and the mobile information terminal 100 are explained using FIG. 3. FIG. 3 is the block diagram illustrating the mounting device and the mobile information terminal in the first embodiment of the present invention.

The mobile information terminal 100 comprises the display unit 102, the connector 103, and the following elements.

A control unit 104 is composed of CPU, etc., and controls each element of the mounting device 200. The control unit 104 also follows the flowchart shown in FIG. 4, and controls each element of the mounting device 200 when the mobile information terminal 100 is connected to the mounting device 200.

A memory 105 is composed of RAM, etc., into which the control unit 104 writes and reads information that is necessary for the processing.

A connection detection unit 106 detects whether there is any electric conduction between the connector 103 and the connector 204.

A battery 107 may be a primary battery or a secondary battery; however, the battery 107 is an object of the charging in the present example.

At the time of charging, power is supplied to the battery 107 via the connectors 204 and 103 from the charger 210.

A communication interface 108 executes communications with an exterior device of the mobile information terminal 100 via the connector 103 or the other elements.

The mounting device 200 comprises a communication interface 211, adding to the ejection mechanism 208, the connector 204, and the charger 210.

The communication interface 211 can communicate with the server 300 etc., and when the mobile information terminal 100 is mounted to the mounting device 200, the mobile information terminal 100 can perform sending/receiving of data with the server 300, etc., via the communication interface 108, the connector 103, the connector 204 and the communication interface 211.

Figure 4:
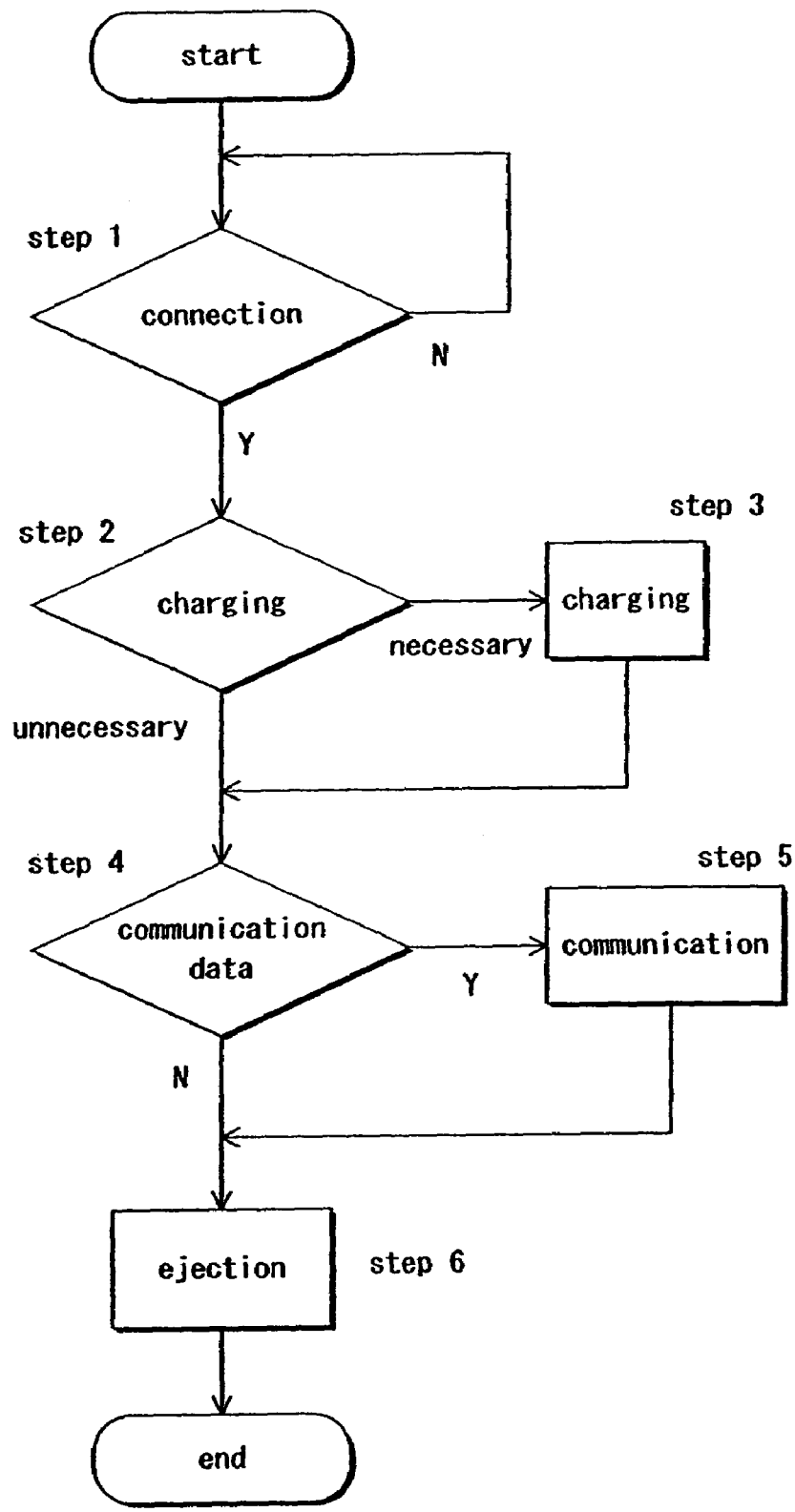
FIG. 4 is a flowchart illustrating the mobile information terminal in the first embodiment of the present invention.

Next, operation of the control unit 104 is explained referring to FIG. 4.

First, in Step 1, the control unit 104 waits until the connection detection unit 106 detects the conduction of the connector 103 and the connector 204.

When the conduction is detected, the control unit 104 checks whether charging the battery 107 is necessary or not in Step 2.

If necessary, charging the battery 107 is executed in Step 3.

At this time, electric power is supplied via the connector 204 and the connector 103 from the charger 210 of the mounting device 200 to the battery 107.

And, the processing moves to Step 4.

On the other hand, if charging is not necessary, the processing moves to Step 4 as it is.

In Step 4, the control unit 104 checks whether or not there is any communication data.

If there is communication data, the server 300 performs the communications with the control unit 104 via the communication interface 211, the connector 204, the connector 103, and the communication interface 108 in Step 5.

Of course, the control unit 104 stores necessary data, such as data received from the server 300, into the memory 105, if necessary.

On the other hand, if there is no communication data, the processing moves to Step 6 as it is.

In Step 6, the control unit 104 operates the ejection mechanism 208.

Thereby, the rod 206 of the solenoid 205 projects, and the mobile information terminal 100 pops up as the arrow N1 in FIG. 1 and FIG. 2 indicates, and then the processing is completed.

As a result of the pop-up, connection of the connectors 103 and 204 is canceled.

Although immediately after completion of charging and communications is desirable for the timing at which the control unit 104 operates the ejection mechanism 208, a delay time may be suitably established.

Charging and communications can be executed simultaneously, and charging also can be executed after communications.

Thereby, since the mobile information terminal 100 is physically ejected from the mounting device 200, a user is able to know the completion of processing easily. Since the mobile information terminal 100 is physically ejected from the mounting device 200, the mobile information terminal 100 is electrically cut off from the mounting device 200, and the mobile information terminal 100 is protected from damage by lightning surge current (it may be induced by a lightning bolt).

Figure 5A:
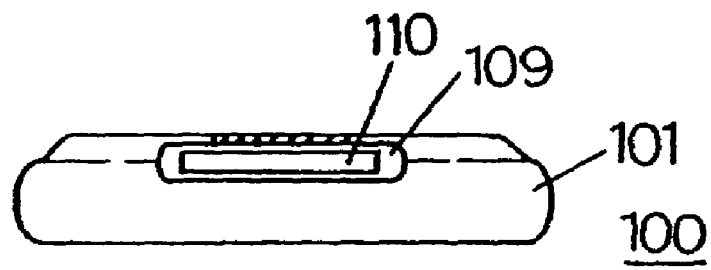
FIG. 5(a) is a ground plan illustrating the mobile information terminal in the first embodiment of the present invention.
Figure 5B:
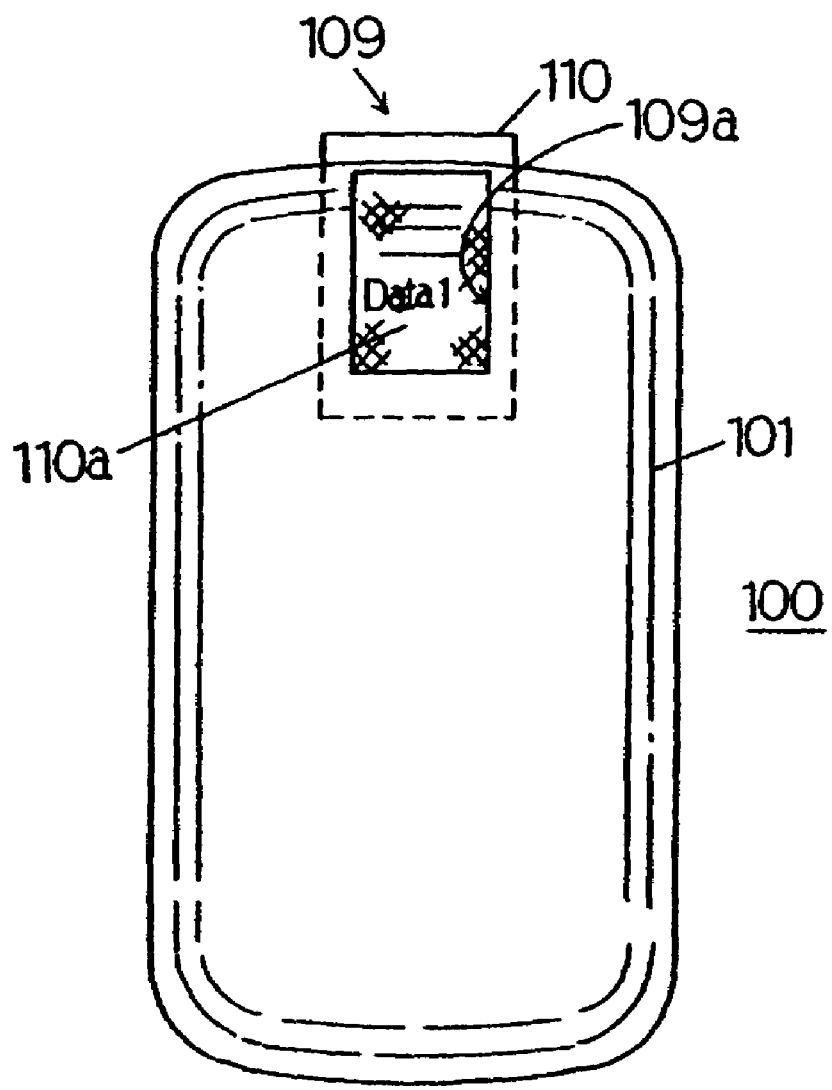
FIG. 5(b) is a drawing illustrating the rear view of the mobile information terminal in the first embodiment of the present invention.

The mobile information terminal 100 of the present embodiment is explained, referring to FIGS. 5(a) and 5(b).

As shown in FIG. 5(a) and FIG. 5(b), the card insertion unit 109, to which a card 110 such as a memory can be inserted, is formed in the back side of the mobile information terminal 100.

A window 109a, which consists of transparent resin, etc., is formed in the card insertion unit 109 so that inside of the card insertion unit 109 can be confirmed by looking from the back side of the mobile information terminal 100.

Therefore, a user can see a label 110a stuck on the card 110 from outside the mobile information terminal 100 in the state where the card 110 has been inserted in the card insertion unit 109.

In short, when a user prints information (for example, the name of data, an index, contents, other attributes) regarding the data recorded on the card 110 and the storage capacity of a card, etc., onto a label 110a, and the label 110a is stuck on the card 110, the user can read the printed information while the card 110 is inserted in the card insertion unit 109; therefore, it is very convenient.

The communications of the mounting device 200 and the mobile information terminal 100 do not have to be the electrical connection of the connectors 103 and 204, but it can be wireless communications based on such as a proposed standard of IEEE802.11 a, b, and g.

In this case, the communications become possible also after the disconnection of the connectors 103 and 204 by ejection.

Embodiment 2

Figure 6:
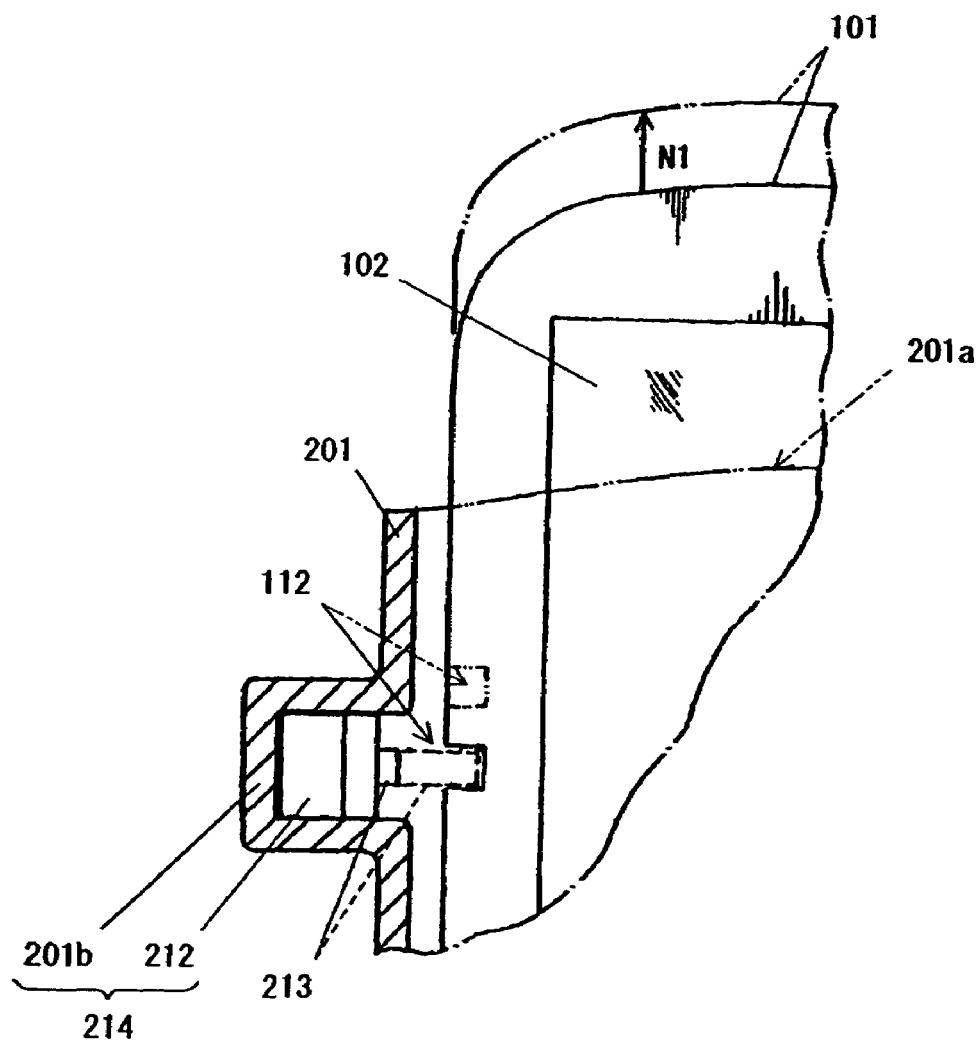
FIG. 6 is a drawing illustrating an enlarged part of the mounting device and the mobile information terminal in a second embodiment of the present invention.
Figure 7:
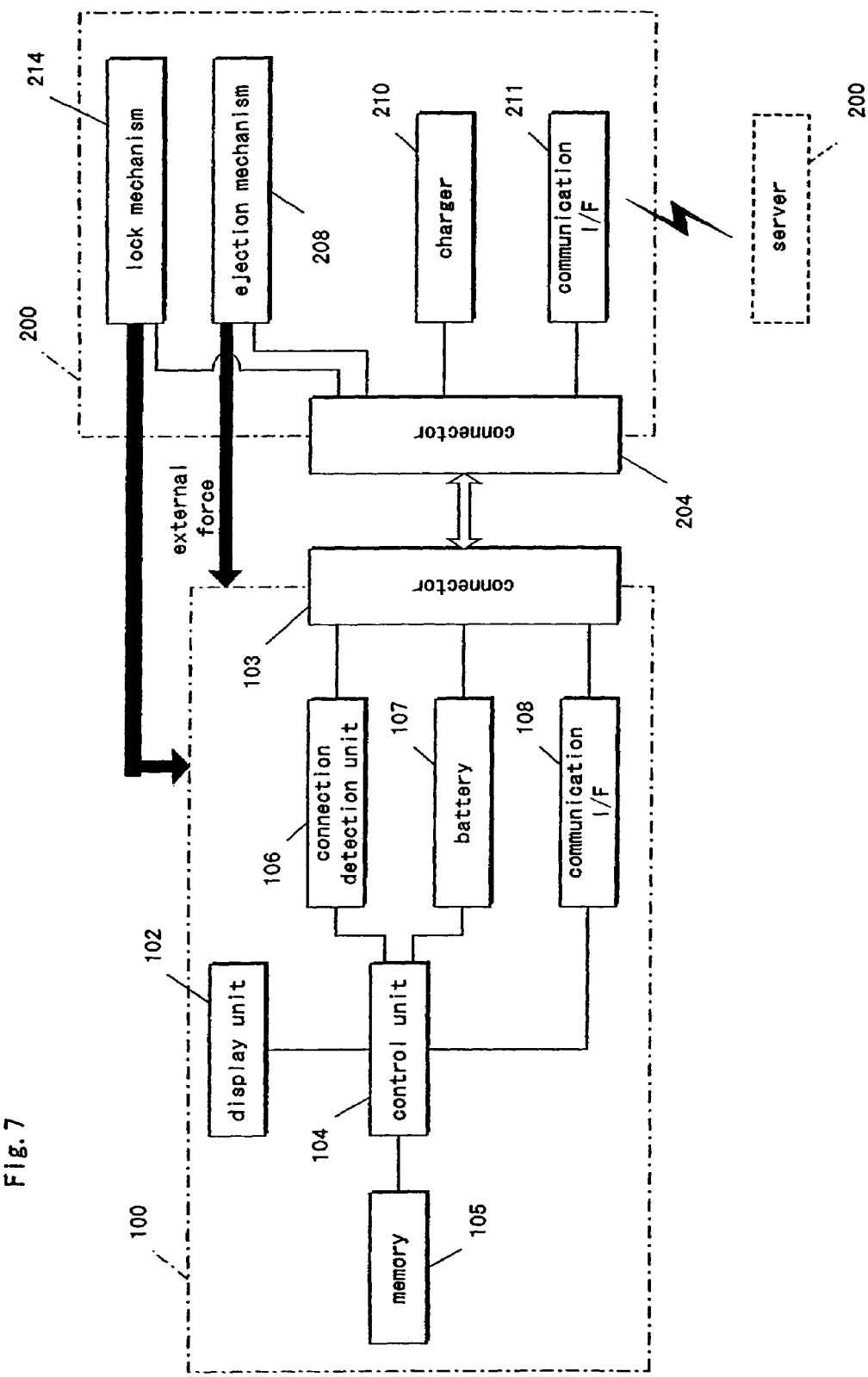
FIG. 7 is a block diagram illustrating the mounting device and the mobile information terminal in the second embodiment of the present invention.
Figure 8:
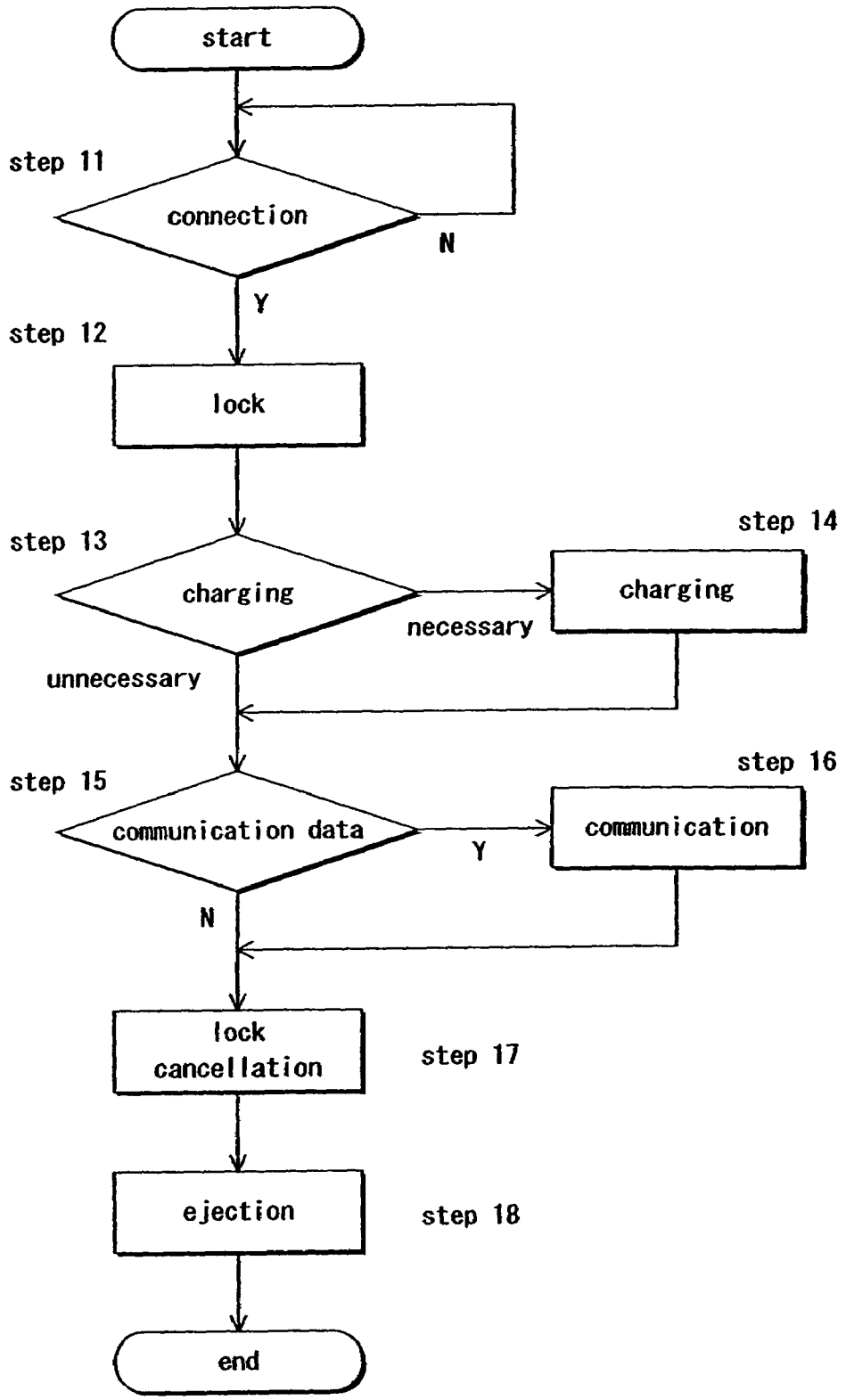
FIG. 8 is the flowchart illustrating the mounting device and the mobile information terminal in the second embodiment of the present invention.

The second embodiment of the present invention is explained referring to FIG. 6 to FIG. 8.

The present embodiment differs in that the lock mechanism has been established, as compared to the first embodiment of the present invention.

Thus, a notch 112 is formed in the side unit as enlarged and shown in FIG. 6.

A part of the case 201 is made to be expanded, and a storage unit 201b is formed. Then, a solenoid 212 is arranged inside of the storage unit 201b, and a rod 213 of the solenoid 212 is made to be turned sideways so as to face the notch 112.

In the state where the mobile information terminal 100 is inserted into the insertion inlet 202 and the connector 103 and the connector 204 are connected (refer to solid lines), the location of the rod 213 and the location of the notch 112 are made to be matched.

At this time, when the solenoid 212 is operated and the rod 213 is made to project from the solid line position to a dashed line position, the top portion of the rod 213 engages with the notch 112, and the mobile information terminal 100 is in the state where it is locked and cannot be removed from the mounting device 200.

When the solenoid 212 is operated and the rod 213 is pulled back into the solid line position from the locked state, the lock is canceled and the mobile information terminal 100 can be removed from the mounting device 200, as the arrow N1 shows.

In the present embodiment, a lock mechanism 214, which forbids and permits removing the mobile information terminal 100 from the mounting device 200, is constructed by the storage unit 201b and the solenoid 212.

The block diagram of the present embodiment is shown in FIG. 7.

Thus, the lock mechanism 214 is added to the mounting device 200 comparing to FIG. 3.

Here, operation of the lock mechanism 214 is controlled by the control unit 104 of the mobile information terminal 100 via the connectors 204 and 103 in the same way as the ejection mechanism 208.

Operation of the mounting device 200 of the present embodiment is illustrated in FIG. 8.

When connection is detected in Step 11, the control unit 104 operates the lock mechanism 214, the rod 213 is made to project into the notch 112, and the mobile information terminal 100 is locked within the mounting device 200 in Step 12.

Then, in Steps 13-16, the same processing as Steps 2-5 of FIG. 4 is performed.

Next, in Step 17, in advance of ejection operation, the control unit 104 operates the lock mechanism 214, and evacuates the rod 213 from the inside of the notch 112. Then, the ejection operation is performed in Step 18.

According to the present embodiment, there is the following effect.

By establishing the lock mechanism 214, a user can avoid extracting the mobile information terminal 100 accidentally.

The lock mechanism 214 is useful to prevent the communications error from being generated due to the extraction of the mobile information terminal 100 from the mounting device 200 in the middle of processing, such as charging or communications. Therefore, it is useful to avoid a possible danger of circuit breakage.

Embodiment 3

Figure 9:
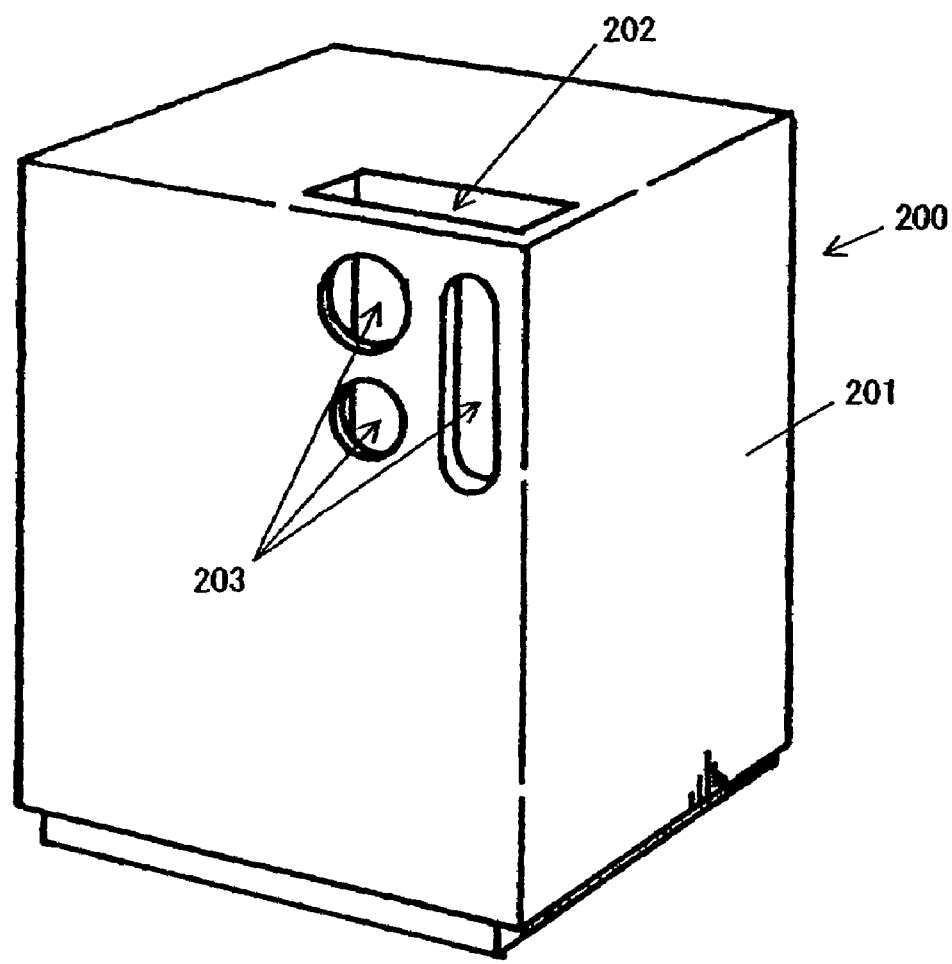
FIG. 9 is a drawing illustrating the oblique perspective view of the mounting device in a third embodiment of the present invention.
Figure 10:
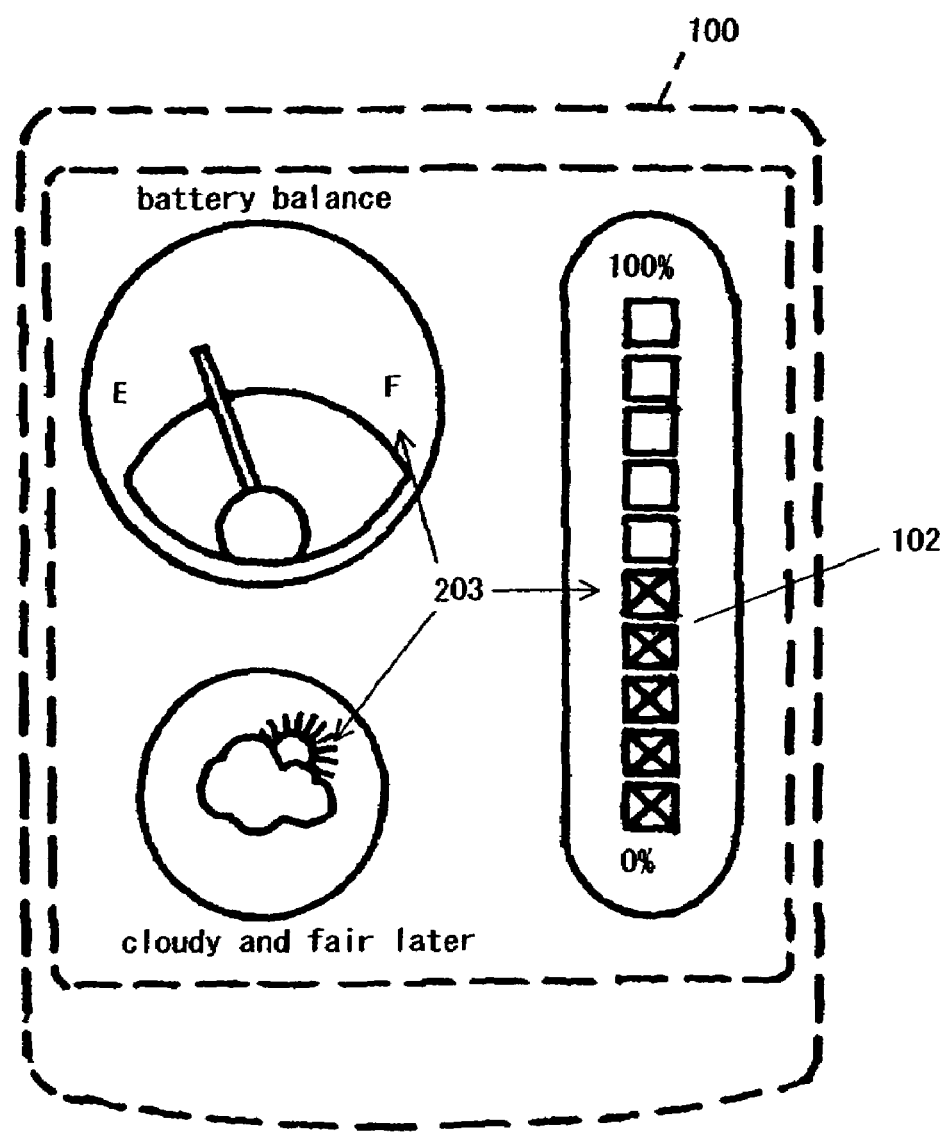
FIG. 10 is an explanatory diagram in the third embodiment of the present invention.

The first embodiment and the second embodiment are applicable also to a business-use mounting device, as shown in FIGS. 9 and 10.

FIG. 9 shows the appearance of the business-use mounting device in such an application, and FIG. 10 illustrates an example of contents of a display.

Especially, it is desirable to apply the second embodiment to this application.

For example, when the present embodiment is applied to data write-in devices (KIOSK terminal, etc.) which will be installed in public places (for example, a shop front, a station, etc.) to sell a digital content, theft of a mobile information terminal can be prevented without escorting of a user during processing.

Embodiment 4

Figure 11:
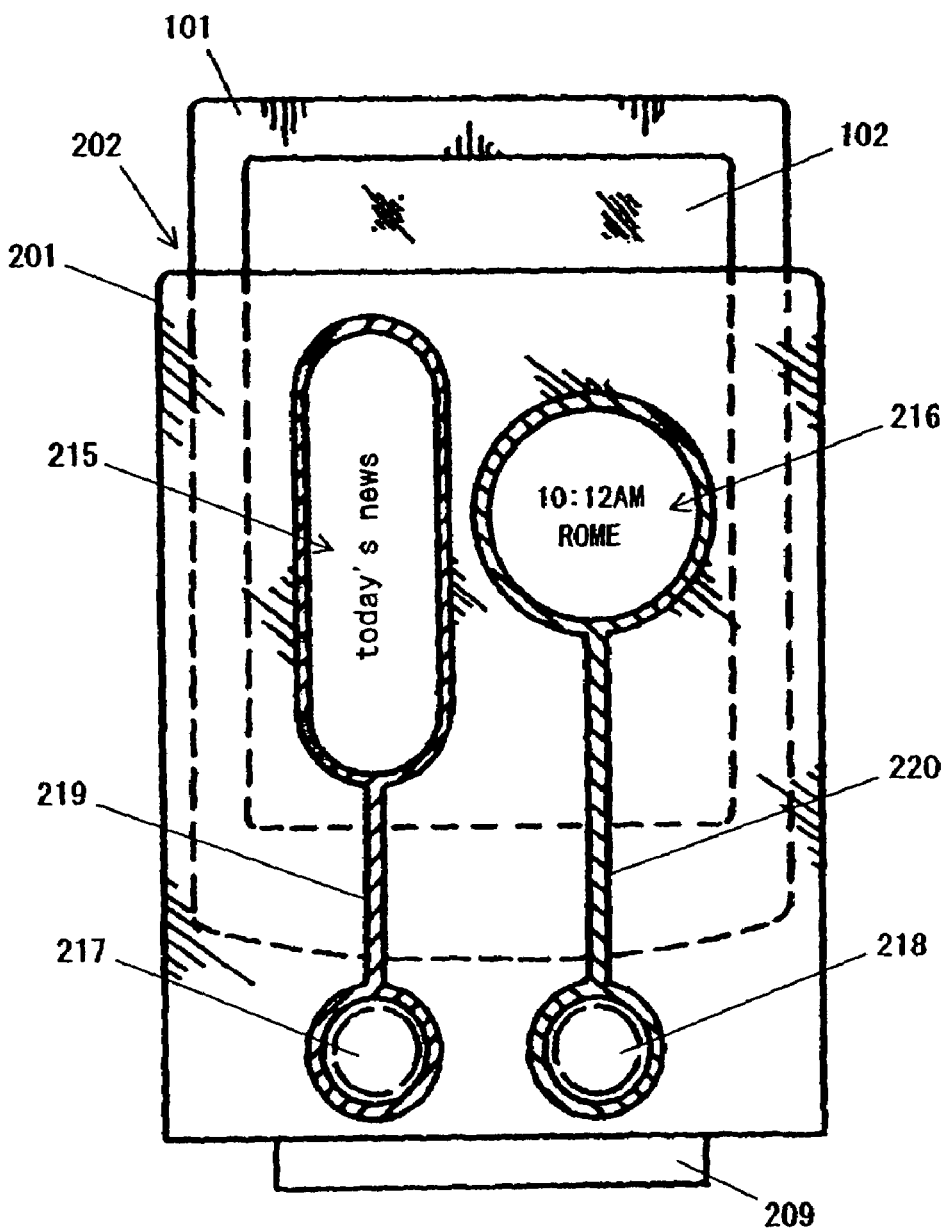
FIG. 11 is a drawing illustrating the front view of the mounting device and the mobile information terminal in a fourth embodiment of the present invention.

A composition of a fourth embodiment of the present invention is explained using FIG. 11.

As shown in FIG. 11, a first window 215, a first button 217 which operates contents of a display of the first window 215, a second window 216, and a second button 218 which operates contents of a display of the second window 216 are arranged at the front side of the case 201.

A connection mark 219 indicates the first window 215 and the first button 217 are related, and a connection mark 220 indicates the second window 216 and the second button 218 are related.

Today's news is displayed on the first window 215.

When a user pushes the first button 217, the latest news data can be acquired from the server 300, the contents of the display of the first window 217 can be scrolled, and continuation of the news can be displayed.

A city and time in the world are displayed on the second window 216.

Every time a user pushes the second button 216, a city which the user wants to display time can be shifted (for example, from Rome to London to Paris, etc.).

An input method is used as a button 251 in the present embodiment.

However, of course, according to the operation purpose, the input method can also be changed into, such as, a volume which determines an input value by a rotation angle of a knob, or a slider, which determines the input value with the movement magnitude of the knob.

According to the present embodiment, the mobile information terminal 100 can be controlled, and contents of a display of the windows 215 and 216 can be changed, by operating the buttons 217 and 218 in the mounting device 200.

That is, an operating environment equivalent to a case where the mobile information terminal 100 is equipped with the input method can be offered, even in the case where the mobile information terminal 100 is not equipped with the input method, by using the input method with which the mounting device 200 is equipped.

Since a user does not touch a mobile information terminal 100 directly, external force does not act on the mobile information terminal 100.

Therefore, even when the mobile information terminal 100 does not equip special devices, such as a lock function, there are few possibilities that electrical connection of connectors 103 and 204 may be canceled accidentally.

Relationship with a window and a button becomes clear by the connection marks, and operation is easy to understand.

The connection mark is not limited to the example of FIG. 11, and can also be constituted by making a color, a design, a form, etc. in agreement in the window and the button mutually relevant.

Embodiment 5

Figure 12:
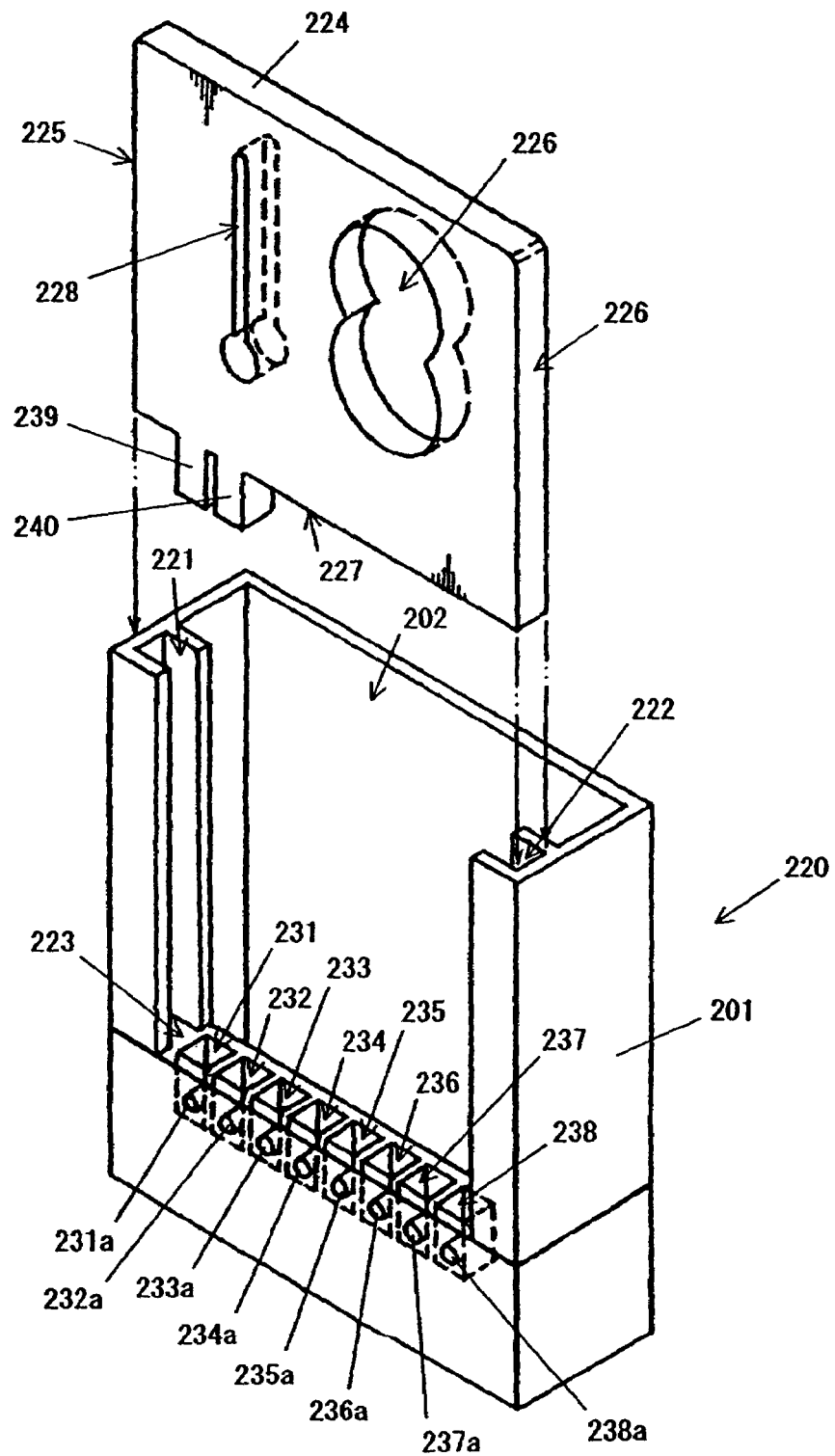
FIG. 12 is a drawing illustrating the oblique perspective view of the mounting device in a fifth embodiment of the present invention.
Figure 13:
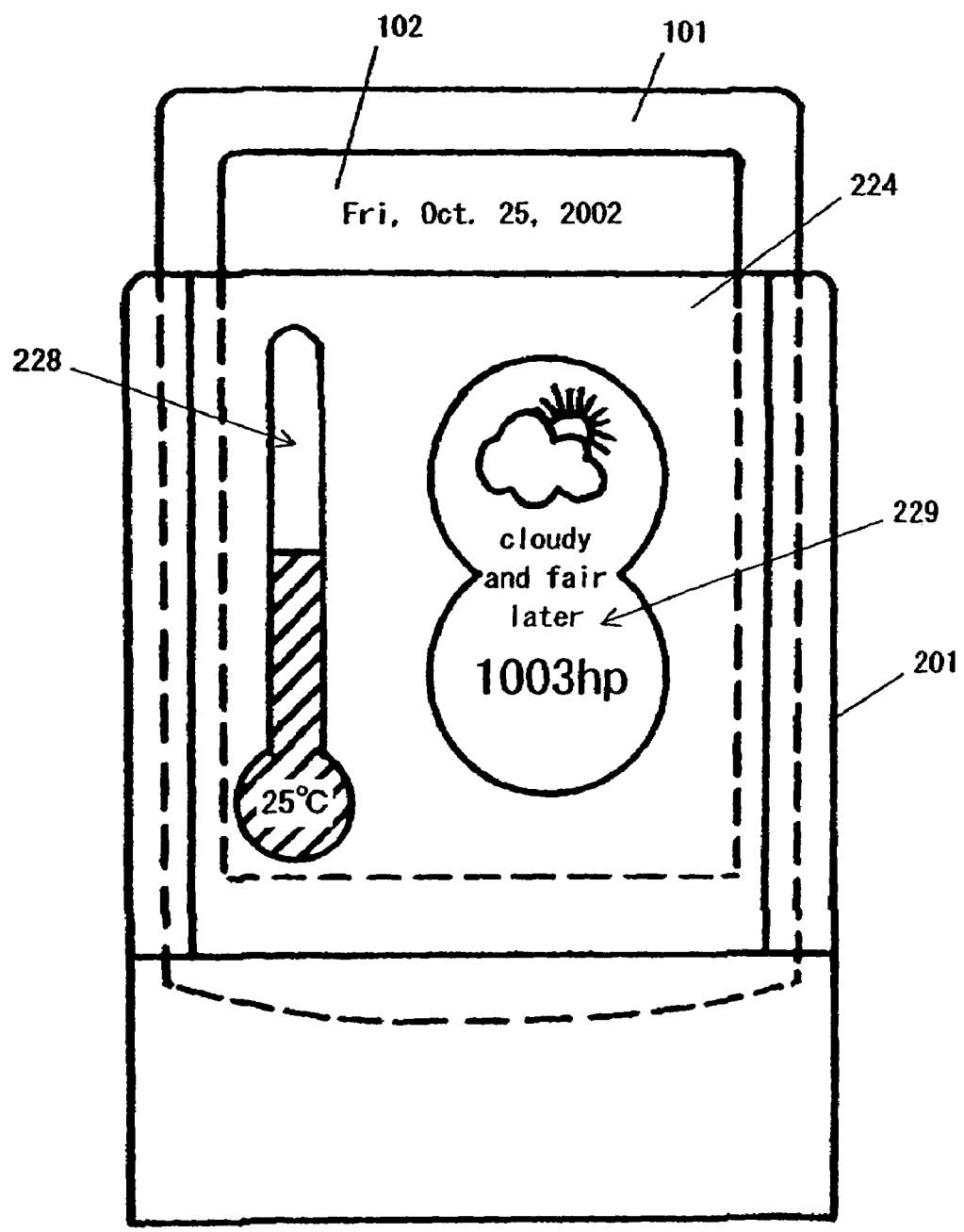
FIG. 13 is a drawing illustrating the front view of the mounting device and the mobile information terminal in the fifth embodiment of the present invention.

A fifth embodiment of the present invention is explained referring to FIG. 12 to FIG. 14.

In the present embodiment, the mounting device 200 comprises a plate which covers the front of the mounting device and is easy to get on and off, and the other portions.

Two or more kinds of plates with different layouts of a window are prepared, and unique identification information is given to each plate and contents of a display of the display 102 is changed based on the identification information.

Thus, as shown in FIG. 12, most of the front side of the mounting device 200 is open, and a left guide 221 and a right guide 222 are perpendicularly provided on both sides of the mounting device 200. The left guide 221 and the right guide 222 are thin and long and have C-character-shaped cross-sections.

The bottom end portions of the left guide 221 and the right guide 222 come in contact with a level abutment surface 223. In the abutment surface 223, equal-shaped insertion holes 231 to 238 are established at an equal pitch.

Sensors 231a to 238a, which detect the existence of the object in the inside concerned, are arranged inside the insertion holes 231 to 238, respectively.

A detection method of the sensors 231a to 238a is arbitrary. For example, the detection method may be mechanical, or may be optical.

As illustrated, a left edge 225 and a right edge 226 of a plate 224 are inserted freely sliding in the left guide 221 and the right guide 222.

When insertion of the plate 224 is completed, a bottom 227 of the plate 224 contacts the abutment surface 223, and the plate 224 cannot descend any more.

Protrusions 239 and 240 protrude downward from the bottom 227 of the plate 224, and the protrusions 239 and 240 are inserted in either of the insertion holes 231 to 238.

The position and the number of the protrusions 239 and 240 are identification information of the plate 224. In the example of FIG. 12, the protrusions 239 and 240 are inserted in the insertion holes 231 and 232, respectively. As a result, the sensor 231a and the sensor 232a detect an object, and the sensors 233a to 238a do not detect the object.

When one bit ("1," when an object is detected; "0," when the object is not detected) is assigned in order of the sensors 231a to 238a, for example, identification information of the plate 224 can be expressed as "11000000" in 8 bits.

Thus, the above-mentioned operation is applicable to 255 kinds of plates.

In the plate 224, windows 228 and 229 which are uniquely determined by the protrusions 239 and 240, are provided.

In FIG. 12, when the mounting device 200 is equipped with the plate 224, the space of the back side of the plate 224 serves as the insertion inlet 202 of the mobile information terminal 100.

FIG. 13 illustrates an example of the mounting device 200 with the plate 224 equipped.

In this example, temperature is displayed on the window 228 in a style of a so-called alcohol thermometer (a thermometer whose glass tube is filled with colored liquid), weather information is displayed on the window 229, and date information is displayed above the case 201.

Thus, the plate 224 is a plate for weather display, and the identification information is expressed by the protrusions 239 and 240. The identification information of the plate 224 which the sensors 231a to 238a have detected, as the embodiments 1 to 3 (refer to FIG. 3), is inputted into the control unit 104 via the connectors 204 and 103. The control unit 104 changes contents of a display of the display unit 102 according to the identification information.

When the plate 224 is removed from the mounting device 200, the sensors 231a to 238a stop detecting an object entirely, and the above-mentioned information is set to "00000000."

Then, the control unit 104 eliminates the display of the display 102.

A plate can be variously prepared for every use.

Figure 14A:
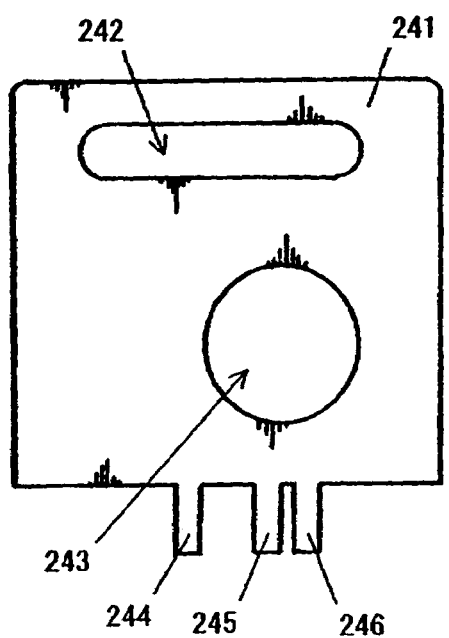
FIG. 14(a) and FIG. 14(b) are drawings illustrating the front view of a plate in the fifth embodiment of the present invention.

For example, a plate 241 indicated in FIG. 14(a) is for displaying news and time. The news is displayed with subtitles on a window 242, and an analogue-type clock is displayed on a window 243.

Figure 14B:
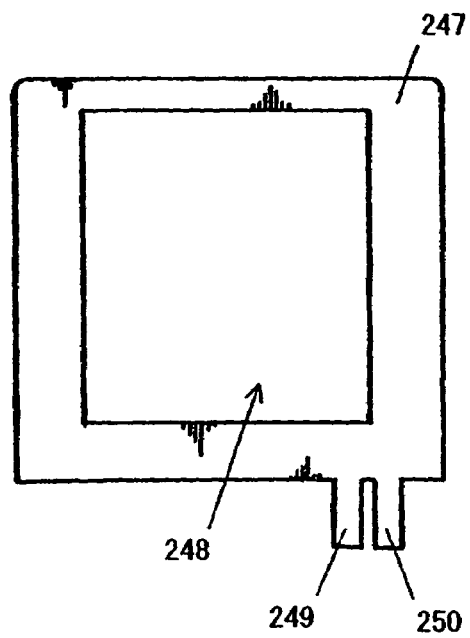

A plate 247 indicated in FIG. 14(b) has a window 248 which displays a photograph.

The number and the position of protrusions 244 to 246 in FIG. 14(a) and protrusions 249 and 250 in FIG. 14(b) are different from the number and the position of the protrusions 239 and 240 in the plate 224 of FIG. 12. Each plate can be identified uniquely by the protrusion provided in a plate.

According to a use, a form, the number, a layout, etc., of the window can be chosen arbitrarily and are not necessarily limited to what is illustrated.

Two or more plates for the same use may be prepared, and a color and a pattern may be attached and distinguished on each plate.

For example, two or more plates for weather displaying are prepared for each area, and a user can distinguish, by appearance, an area which the user wants to obtain weather information.

It is desirable to provide several plates for photographs with different colors defined for every theme, such as blue for "relaxation," green for "waking," and red for "energy," and to establish a protrusion of a different position for each plate for photographs.

Thereby, by choosing a color of a plate for photograph according to the feeling, and equipping the chosen plate on the mounting device 200, a user can preferably display a photograph which may mach the feeling of the user at the time.

In the present embodiment, the kind of plate is identified by combining a protrusion of a plate and a sensor.

However, identifying the kind of plate uniquely is sufficient. For example, a noncontact electronic tag (IC tag) may be embedded on a plate, and an electronic tag reader may be used as a sensor. Or a bar code label may be labeled on a plate and the bar code reader may be used as a sensor.

Thus, a plate without a protrusion is realizable.

According to the present embodiment, a user can select the function of a mobile information terminal, and can display desired data legibly, only by selecting a plate, equipping the plate to a mounting device, without menu selection or a special operation of button depression.

Since operation is easy and understandable for elderly people, children, and the handicapped, etc., who are poor at operating a device, the present embodiment is preferable.

According to the present invention, when a processing to a mobile information terminal mounted to a mounting device is completed, the mobile information terminal can be ejected, the relative positional relationship of the mobile information terminal and the mounting device can change, and a user can know the completion of the processing easily.

By ejecting the mobile information terminal, the electrical connection of the mobile information terminal and the mounting device can be disconnected, and it becomes possible to protect the mobile information terminal from sudden accidents, such as overcurrent due to lightning By locking the mobile information terminal to the mounting device during processing, there are effects of theft prevention at public places, such as a KIOSK terminal of a shop front, and prevention of the operational mistake of extracting a terminal accidentally.

According to the present invention, displaying with a different mode for every domain sectioned by a window of a case can be carried out.

Though a mobile information terminal is locked to a mounting device, various messages, such as a progress status of processing, a weather forecast, and an advertisement, can be displayed, thus an easy-to-handle facility can be offered.

Having described preferred embodiments of the invention with reference to the accompanying drawings, it is to be understood that the invention is not limited to those precise embodiments, and that various changes and modifications may be affected therein by one skilled in the art without departing from the scope or spirit of the invention as defined in the appended claims.

What is claimed is:

1. A mounting device for mounting and dismount thereto a mobile information terminal with a display unit, the mounting device for executing processing for the mobile information terminal, and the mounting device comprising:
    a case having an insertion inlet for the mobile information terminal,
    wherein said case comprises a plate having a plurality of windows through which content displayed on the display unit is visually recognizable from outside, and
    wherein each of said plurality of windows of said plate has an unique identification information associated therewith,
    wherein said case comprises a sensor operable to read the identification information, and
    wherein content to be displayed on the display unit is alterable according to the identification information read by said sensor, and
    wherein each of said plurality of windows shows a different kind of content.

2. A mounting device as defined in claim 1,
    wherein said plurality of windows partition the display unit.

3. A mounting device as defined in claim 2, further comprising:
    a connector operable to establish electrical connection with the mobile information terminal inserted in the insertion inlet.

4. A mounting device as defined in claim 3, further comprising:
    an input unit operable to be related to said plurality of windows,
    wherein said input unit is operable to control the mobile information terminal inserted in the insertion inlet based on manipulation of said input unit.

5. A mounting device as defined in claim 1,
    wherein a front part of said case is open and covered with said plate, and
    wherein content displayed on the display unit is visually recognizable from outside through said plurality of windows.

6. A mobile information terminal operable to be mounted to the mounting device as defined in claim 3, the mobile information terminal comprising:
    a control unit operable to control the display unit via said connector,
    wherein said control unit is operable to control the display unit to display different displays in every domain partitioned by said plurality of windows.

* * * * *